(12) United States Patent
Huber et al.

(10) Patent No.: US 7,766,575 B2
(45) Date of Patent: Aug. 3, 2010

(54) INTERNALLY SPLINED PART

(75) Inventors: David P. Huber, Millbury, OH (US);
Ben R. Vasa, Lapeer, MI (US); Timothy J. Cripsey, Rochester, MI (US)

(73) Assignee: Metal Forming & Coining Corporation, Maumee, OH (US)

( * ) Notice: Subject to any disclaimer, the term of this patent is extended or adjusted under 35 U.S.C. 154(b) by 1006 days.

(21) Appl. No.: 10/684,318

(22) Filed: Oct. 11, 2003

(65) Prior Publication Data

US 2004/0081513 A1   Apr. 29, 2004

(51) Int. Cl.
*B25G 3/28* (2006.01)
(52) U.S. Cl. ............... 403/359.1; 403/359.2; 403/359.6
(58) Field of Classification Search ... 403/359.1–359.6; 464/82, 83, 162, 180, 181; 74/490, 492
See application file for complete search history.

(56) References Cited

U.S. PATENT DOCUMENTS

| 177,337 | A | | 5/1876 | Johnson | |
|---|---|---|---|---|---|
| 3,224,223 | A | * | 12/1965 | Wildhaber | 464/158 |
| 4,552,544 | A | | 11/1985 | Beckman et al. | |
| 5,315,805 | A | * | 5/1994 | Harsch | 403/170 |
| 5,716,276 | A | * | 2/1998 | Mangas et al. | 464/16 |
| 6,026,700 | A | * | 2/2000 | Mancuso et al. | 464/158 |
| 6,405,835 | B1 | * | 6/2002 | Satou et al. | 188/71.5 |
| D473,663 | S | * | 4/2003 | Chou | D25/122 |

* cited by examiner

*Primary Examiner*—Victor MacArthur
(74) *Attorney, Agent, or Firm*—Fraser Clemens; Martin & Miller LLC; Donald R. Fraser

(57) ABSTRACT

An internally splined component for transmitting torque wherein the splines are cold formed to predetermined tolerances.

8 Claims, 3 Drawing Sheets

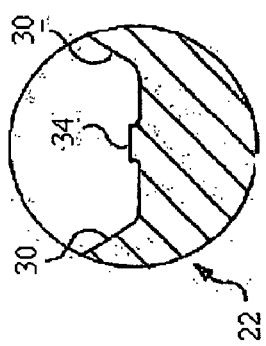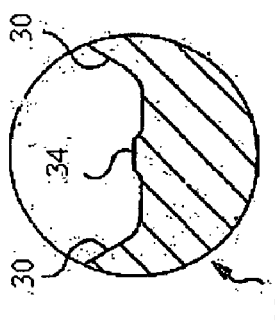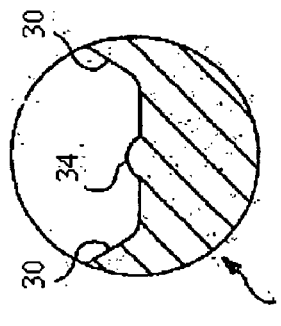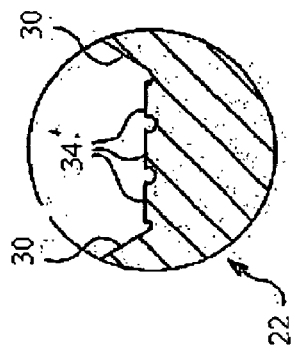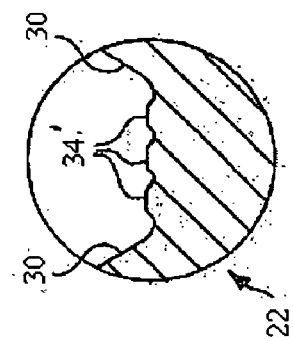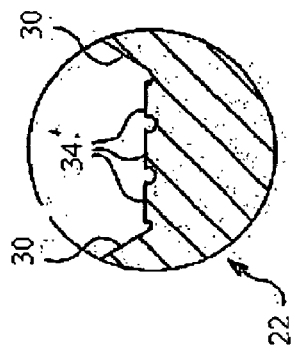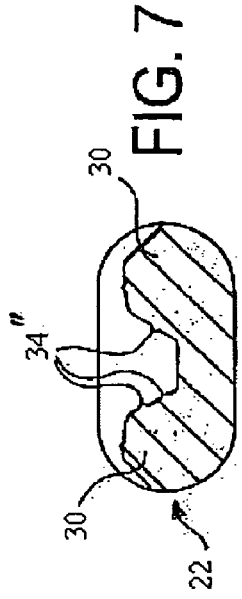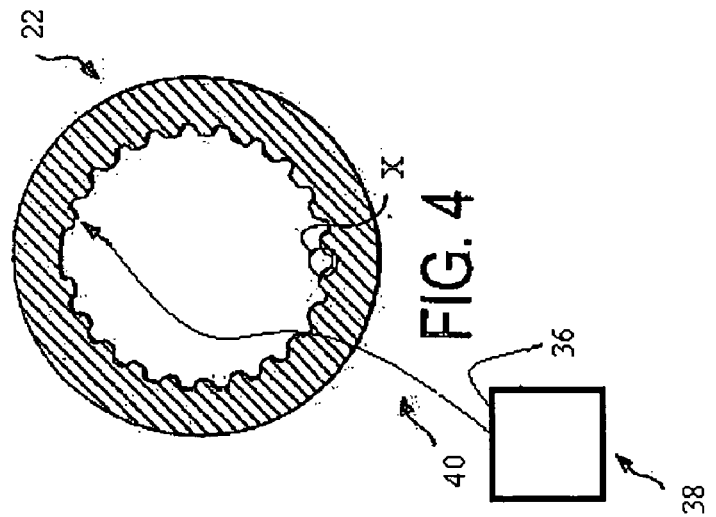

INTERNALLY SPLINED PART

This application is a continuation of international application number PCT/US03/03922 filed Feb. 10, 2003 (status, abandoned, pending, etc.).

This application claims the benefit of U.S. Provisional Patent Application Ser. No. 60/362,173, filed Mar. 5, 2002.

BACKGROUND OF THE INVENTION

1. Field of the Invention

The present invention relates to couplings and more particularly to splined couplings for transmission of torque.

2. Description of the Prior Art

It is common in the field of torque transmission to utilize splined joints to allow extension or compression of the length of a shaft transmitting torque between two components. Such splined joints usually consist of an externally splined male component and an internally splined female component. These components are assembled in the typical fashion.

Looseness or backlash in such joints can be detrimental to the proper and efficient function of the assembly in efficiently transmitting torque between driving and driven components.

In order to minimize backlash between the mating splined components, clearance between the spacing between the splines in the female component and thickness of the teeth of the male component is maintained at a minimum. Concentricity between the two splined components of such an assembly is important. Contrary to the backlash consideration and minimization, reasonable manufacturing capability is typically not considered in the associated manufacturing specifications.

The most cost effective methods in the manufacturing process for volume production of high strength female splined components, include broaching and cold forming. While both of these processes are capable of producing such components with required tolerances on the spacing of the splines and the width of the splines, neither of the processes is effective at maintaining tight tolerances for the major or minor diameter fitting of associated components. This is primarily caused by the elastic properties of the metals used in the formation of these components, and to the internal stresses in the workpiece material. In broaching, the workpiece is oftentimes temporarily deformed due to the pressure exerted on it by the cutting tool. Accordingly, the cutting of the metal of the workpiece is not in its free, undistorted state. When the pressure is released at the end of the cutting operation, the workpiece returns to its free state form and the spline feature of the workpiece varies from its optimum geometry.

In cold forming the material of the workpiece tends to spring back, from the optimum shape after the forming pressure is released.

Large changes in the shape of the workpiece, both in the broaching and cold forming processes can result in unstable dimensional integrity of the workpiece. Residual stresses can be left in the workpiece due to previous mechanical or thermal processing. This causes non-uniform strength properties which can result in a workpiece being distorted to an out-of-round condition. Frequently, the distortion in the roundness of these workpieces exceeds the total permitted tolerance variation.

It is an object of the present invention to produce an internally splined component and a method of making the same wherein the splined components are provided with small cross-section ribs machined to tight tolerances.

Another object of the invention is to produce a splined component having a rib formed on the spline to achieve close tolerances.

SUMMARY OF THE INVENTION

The above, as well as other objects of the invention are achieved by a splined component for transmitting torque comprising a main body having a longitudinal axis, and a plurality of spaced apart splines extending from the body and generally parallel to the axis of the body, the splines having a small cross-section raised portion extending away from the splines.

BRIEF DESCRIPTION OF THE DRAWINGS

The above objects and advantages of the invention will become readily apparent to those skilled in the art from reading the following detailed description of the invention when considered in the light of the accompanying drawings, in which:

FIG. 4 is a top plan view of an internally splined part formed by the operations illustrated in FIGS. 2 and 3 embodying the features of the present invention;

FIGS. 5a, 5b, and 5c are enlarged fragmentary sectional views of the detail area of the splines on the part illustrated in FIG. 4 showing embodiments of the invention utilizing a single ridge;

FIGS. 6a, 6b, and 6c are enlarged fragmentary views similar to FIGS. 5a, 5b, and 5c showing another embodiment of the invention wherein a plurality of ridges are employed;

FIG. 7 is an enlarged fragmentary view of the detail area illustrated in FIG. 4 showing alternate locations of the ridges.

FIGS. 8 and 8A illustrate the internally splined component 22 when assembled with the corresponding shaft 38. The ribs 34 contact the corresponding shaft 38. At least a portion of each of the ribs 34 is removed or deformed by the contact, and causes the component 22 and the corresponding shaft 38 to maintain contact when assembled, for example, to meet the specified tolerances.

DESCRIPTION OF THE PREFERRED EMBODIMENT

Figure 1:
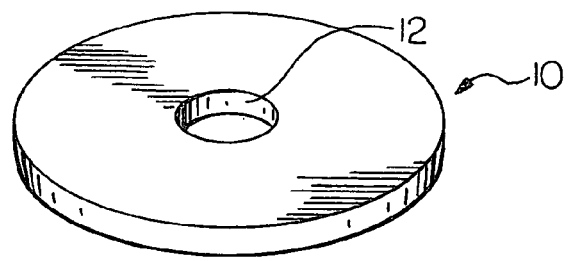
FIG. 1 is a perspective view of a blank of stock from which the splined part of the invention is formed.
Figure 2:
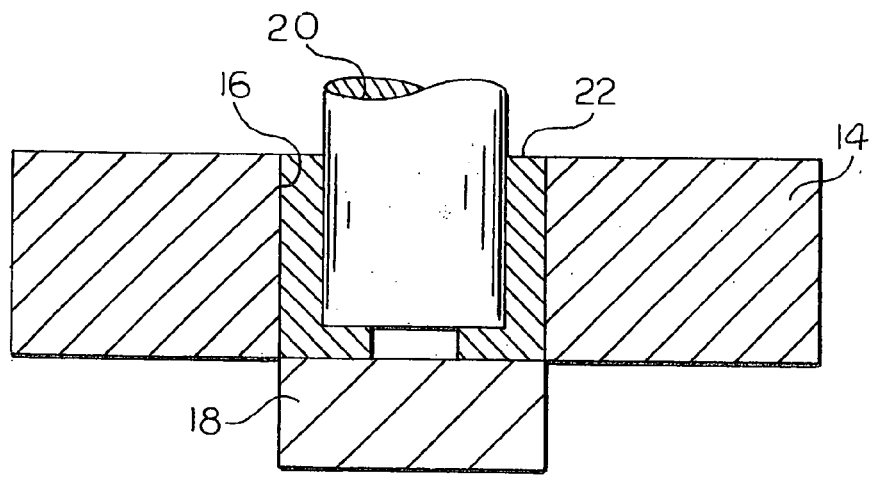
FIG. 2 is a schematic sectional view of a die and punch arrangement for forming the blank illustrated in FIG. 1.
Figure 3:
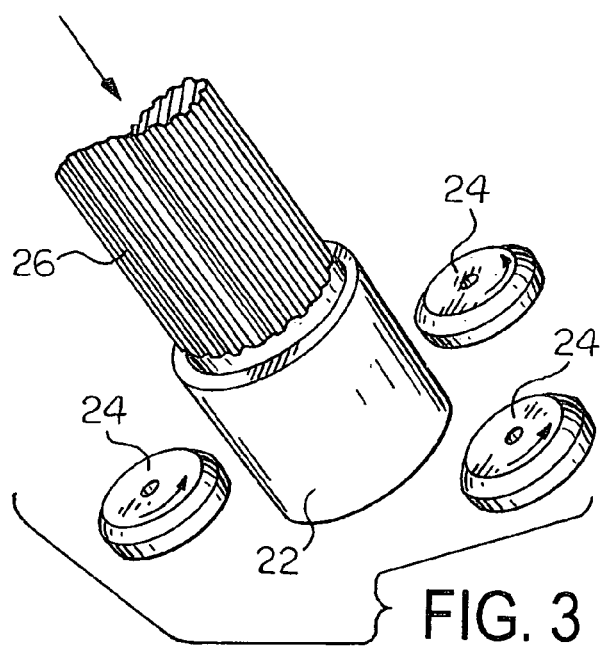
FIG. 3 is a schematic view of the apparatus used to form splines on the internal surfaces of the part formed by the operation illustrated in FIG. 2.
Figure 8:
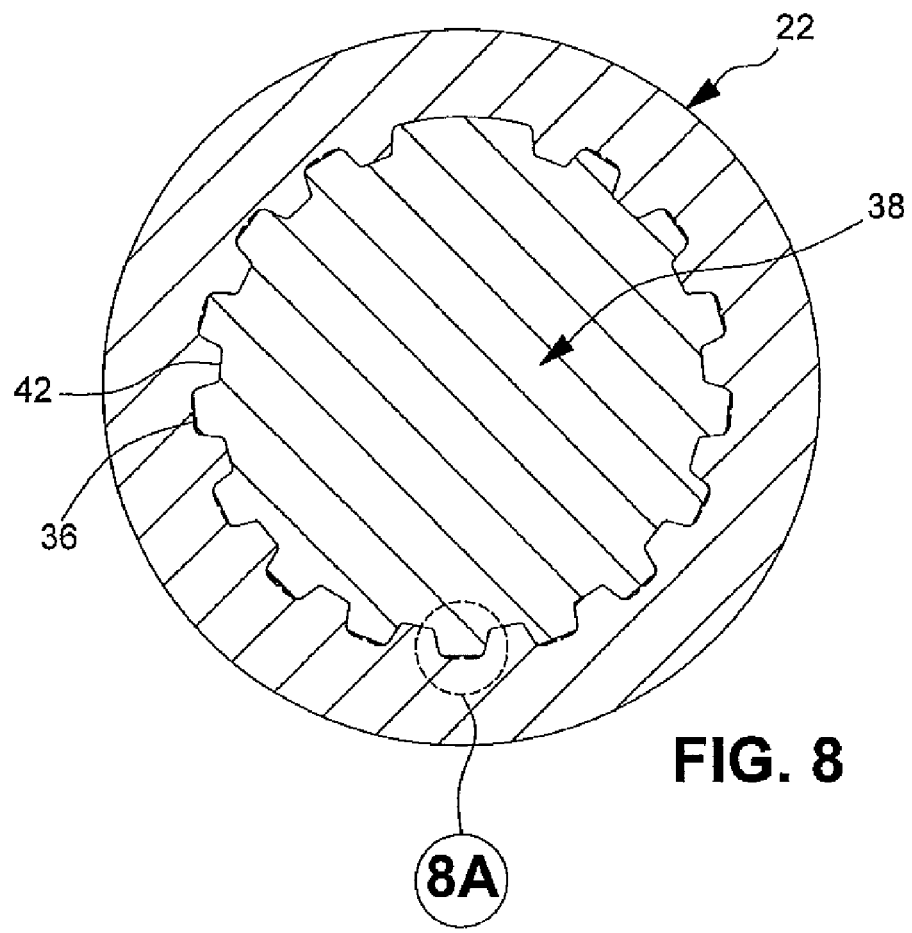
FIG. 8 is top plan view of an internally splined part formed by the operations illustrated in FIGS. 2 and 3, and further showing a cooperation of the internal splines with slots on a corresponding shaft.
Figure 8A:
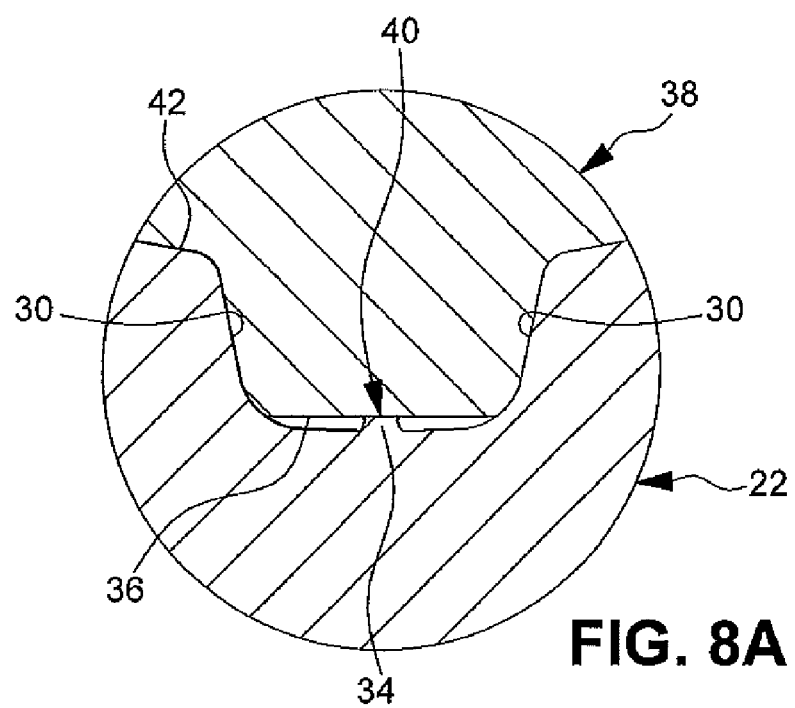
FIG. 8A is an enlarged fragmentary view of the detail area illustrated in FIG. 8 showing the raised portions contacting the surface of the corresponding shaft.

Referring to the drawings, wherein like reference numerals refer to similar components throughout, there is illustrated in FIGS. 1, 2, and 3 the various steps of the method for producing an article embodying the features of the invention. More specifically, FIG. 1 illustrates the preferred shape of a blank or slug 10 used to obtain the new and improved article. The blank 10 is typically formed from plate stock of a female meter such as, for example, a 6061 aluminum alloy. The blank 10 is typically provided with a centrally formed aperture 12. As illustrated in FIG. 2, the blank 10, to be formed, is then placed on the upper surface of a die 14 provided with a cylindrical cavity 16 extending from the upper surface of the die 14 to the lower surface thereof.

The blank 10 is disposed such that the central aperture 12 is coaxial with the cavity 16. A stool 18 is positioned adjacent the lower surface of the die 14 and suitably closes the cavity 16.

Once the blank 10 is suitably positioned on the die 14, a reciprocating punch 20 is driven axially downwardly causing the metal of the blank 10 to flow between the outer surface of the punch 20 and the inner surface of the cylindrical cavity 16 to form a cup shaped part 22. It will be appreciated that the downward thrust of the punch 20 acts against the stool 18. At the end of the downward forming movement of the punch 20, the punch may be withdrawn and the part 22 removed by either causing upward movement of the stool 18 or removing the stool 18 and permitting the part 22 to be released from the die 14.

The cup shaped part 22 is then disposed to travel between the outer rotating forming surfaces of an assembly of three forming rollers 24. Prior to passing through the forming rollers 24, a cylindrically shaped mandrel 26 having a plurality of longitudinally extending spaced apart splines 28 is inserted within the cylindrically shaped interior of the cup shaped article 22 until the end of the mandrel 26 typically abuts against the bottom of the cup shaped article 22 containing the aperture 12. Next, force is applied to the mandrel 26 causing it to move in the direction of the arrow in FIG. 3. The force causes the mandrel 26 and the cup shaped article 22 to pass through the cooperating outer peripheral surfaces of the rotating forming rollers 24. Since the distance between the contacting surfaces of the forming rollers 24, which are displaced from one another by one hundred twenty (120°) degrees, to the central axis of the mandrel 26 is less than the radius of the outer surface of the cup shaped part 22, the metal of the side walls of the part 22 is caused to flow such that the metal adjacent the outer formed surface of the mandrel 26 actually flows generally inwardly causing the inner surface of the part 22 to assume the shape of the outer surface of the mandrel 26.

FIG. 4 illustrates configuration of the part 22 after the mandrel 26 has forced the cup shaped part 22, illustrated in FIGS. 2 and 3, between the outer surface of the cooperating rotating forming rollers 24. The innermost surface of the part 22 now is formed with an annular array of axially extending spaced apart parallel splines 30, the splines 30 being any of a series of projections on the part 22 or shaft that fit together into grooves or slots 42 on a corresponding shaft 38. While the above description describes the method of forming the part 22, the following description more specifically details the unique configuration of the inner surface of the part 22.

In the embodiment of the invention illustrated in FIGS. 5a, 5b, and 5c there is illustrated a spline configuration wherein the splines 30 are provided with a rib or ridge 34, having a small cross-section, formed along the entire length of the highly toleranced surfaces between adjacent ones of the splines 30 of the component 22. The ribs 34 facilitate the achievement of the required tolerances of the component 22. The ribs 34 contact an outer surface 36 of a corresponding body, for example, the corresponding shaft 38. An arrow 40 is meant to designate contact between the rib 34 and the outer surface 36 of the corresponding shaft 38.

FIGS. 6a, 6b, and 6c are similar to FIGS. 5a, 5b, and 5c showing another embodiment of the invention wherein a plurality of ridges 34' are formed between adjacent splines 20.

FIG. 7 illustrates another embodiment wherein the ridges 34" are formed in locations different from those illustrated in the other figures.

It will be understood that the ridges or ribs may be created or formed on one or more of the minor diameter surfaces, the major diameter surfaces, the flanks of the splines, or any combination.

Also, the ribs or ridges may contain individual humps or multiple humps. The surfaces on which the ribs are formed may contain multiple ribs or ridges.

The ribs or ridges may be formed by many manufacturing methods, including cold forming, broaching, and shaper cutting.

The ribs or ridges must contain sufficient material to permit the removal or deformation of a portion of the material to cause the component to meet the specified tolerances. By maintaining the ribs or ridges of small cross-sectional dimension, the cutting or deformation forces employed in calibrating the size of the ribs or ridges on the finished component will be small enough to militate against the distortion of the workpiece as a whole.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A splined component for transmitting torque comprising:
   a main body of formable metal and having a longitudinal axis;
   a plurality of spaced apart splines of formable metal being generally parallel to the longitudinal axis of and extending from said main body and being projections on said main body that cooperate with slots on a splined outer surface of a corresponding shaft enabling cooperative rotation; and
   a plurality of/small raised portions of said formable metal extending away from said main body and being generally parallel to the axis of said main body, each of said raised portions having a cross-sectional area less than a cross-sectional area of each of said spaced apart splines, at least one of said raised portions adapted to contact the splined outer surface of the corresponding shaft and having sufficient material to permit at least one of a removal and a deformation of a portion of the at least one raised portion upon contact of the at least one raised portion with the splined outer surface of the corresponding shaft to maintain contact between the splined component and the corresponding shaft, wherein said splines, raised portions, and the main body of the splined component are integral and homogenous.

2. The component defined in claim 1 wherein said main body is hollow.

3. The component defined in claim 2 wherein said splines extend inwardly.

4. The component defined in claim 3 wherein said raised portions are uninterrupted.

5. The component defined in claim 4 wherein said raised portions are disposed between said spaced apart splined.

6. The component defined in claim 4 wherein said raised portions are disposed on the surface of said spaced apart splines.

7. The component defined in claim 1 wherein the formable metal of said body, said splines, and said raised portions is an aluminum alloy.

8. The component defined in claim 1, wherein the splined outer surface of the corresponding shaft includes a plurality of spaced apart splines, each of the splines radially extending from the corresponding shaft and terminating with a base, and wherein said raised portions are disposed between said spaced apart splines on the splined component, wherein said at least one raised portion is adapted to contact the base of one of said splines of the corresponding shaft.

* * * * *